(12) United States Patent
Holman, Jr.

(10) Patent No.: US 7,047,760 B1
(45) Date of Patent: May 23, 2006

(54) COMBINATION AC/HP-REFRIGERATOR APPARATUS AND METHOD

(76) Inventor: Norman W. Holman, Jr., 7400 Wymart Rd., Pensacola, FL (US) 32526

( * ) Notice: Subject to any disclaimer, the term of this patent is extended or adjusted under 35 U.S.C. 154(b) by 0 days.

(21) Appl. No.: 10/989,089

(22) Filed: Nov. 15, 2004

(51) Int. Cl.
*F25D 17/06* (2006.01)

(52) U.S. Cl. .......................... 62/428; 62/476

(58) Field of Classification Search ................ 62/141, 62/183, 239, 428, 448, 452, 456, 476, 490, 62/493
See application file for complete search history.

(56) References Cited

U.S. PATENT DOCUMENTS

| | | | | |
|---|---|---|---|---|
| 2,559,821 A | * | 7/1951 | Kagon | 62/239 |
| 3,760,602 A | * | 9/1973 | Blomberg | 62/490 |
| 3,771,320 A | * | 11/1973 | Kenneryd et al. | 62/239 |
| 3,775,996 A | * | 12/1973 | Blomberg | 62/490 |
| 3,851,497 A | * | 12/1974 | Blomberg et al. | 62/452 |
| 3,875,369 A | * | 4/1975 | Sellerstam | 392/307 |
| 4,691,529 A | * | 9/1987 | Blomberg et al. | 62/332 |
| 6,098,414 A | * | 8/2000 | Boxum | 62/141 |
| 6,148,629 A | * | 11/2000 | Boxum | 62/239 |
| 6,318,098 B1 | * | 11/2001 | Boxum | 62/183 |
| 6,543,250 B1 | * | 4/2003 | Mills et al. | 62/428 |

FOREIGN PATENT DOCUMENTS

JP     2000-88393 A  *  3/2000

* cited by examiner

*Primary Examiner*—Mohammad M. Ali
(74) *Attorney, Agent, or Firm*—J. Nevin Shaffer, Jr.

(57) ABSTRACT

A combination AC/HP-refrigerator apparatus and method includes, according to one embodiment, a common condenser duct connected to an AC/HP device with a condenser and to a refrigerator wherein the AC/HP condenser is located in the common condenser duct above the refrigerator. A boiler duct is connected to the refrigerator and an evaporator duct is connected to the AC/HP device.

20 Claims, 6 Drawing Sheets

COMBINATION AC/HP-REFRIGERATOR APPARATUS AND METHOD

FIELD OF THE INVENTION

This invention relates to a combination AC/HP-refrigerator apparatus and method. In particular, according to one embodiment, the invention relates to a combination AC/HP-refrigerator including a common condenser duct connected to an AC/HP device with a condenser and to a refrigerator wherein the AC/HP condenser is located in the condenser duct above the refrigerator. A boiler duct is connected to the refrigerator and an evaporator duct is connected to the AC/HP device.

BACKGROUND OF THE INVENTION

The design and operation of air conditioner (AC) and heat pump (HP) units are well-known. The application of combination AC/HP units for use in areas outside of homes including but not limited to, vehicles such as recreational vehicles (RVs) such as vans, trailers, motor homes, fifth wheelers, etc. is also well-known. For purposes of example only and not by way of limitation, AC/HP units used with RVs are typically mounted on the roof with few, if any, exceptions. A problem exists with the roof mounted AC/HP units however in that these roof-mounted AC/HP units inherently produce aerodynamic drag and, subsequently, decrease fuel economy. Further, roof mounted AC/HP units require ladders or scaffolding for installation, service and/or removal. In an attempt to reduce problems associated with roof mounted AC/HP units, modern roof mounted AC/HP units feature low-profile designs. These low-profile units are designed to reduce aerodynamic drag but in doing so the AC/HP units suffer a reduction of efficiency because the AC/HP unit condenser and operator coil sizes are reduced. In the end, even the low-profile units create aerodynamic drag and, worse, cause a serious reduction in the operating capabilities of the AC/HP unit.

Likewise, the design and operation of refrigerators, either of the mechanical type with electric motor, compressor, fans, etc. or a piezo-electric type with no moving parts (unless a blower fan is added), or an absorption system type with no moving parts, is well-known. Early mechanical type refrigerators mounted condenser coils on the rear or top of the unit for heat to be dissipated by convection. Modern mechanical type refrigerators mount condenser coils within a duct ventilated by an electrically powered fan to force airflow over the coils and, subsequently, improve the efficiency. Absorption system refrigerators (ASR) are widely used in vehicles and depend on convection induced by heated air to dissipate the heat of the condenser and absorber. Unfortunately, the recovery time of an ASR is a major problem. Typically, the recovery time of an ASR is on the order of one hour of recovery required for every minute the refrigerator door is left open. By comparison, the mechanical type refrigerator has a recovery time of fifteen to twenty minutes.

By way of example only, and not by limitation, ASR's are commonly found in RVs. Wherever they are located, ASR's require a vertical duct or shaft at the rear of the refrigerator to enclose the boiler, condenser, and absorber components of the ASR. The duct or shaft has an external intake and an external exhaust opening or port with grills at the bottom and top of the shaft, respectively, and are ventilated outside of the RV. ASR's operate most efficiently when the differential between the condenser coil temperature and the external ambient air is greatest as in colder seasons. Conversely, the ASR's operate least efficiently when the temperature differential is minimal as in the hotter seasons. Further, the boiler of the ASR's may be heated by electrical coils or a burner using propane, kerosene, or some other acceptable fuel. Unfortunately, the burner flame is vulnerable to gusts and fast flowing air currents. In order to protect the burner from air currents, among other things, typically the vertical duct or shaft at the rear of the ASR (that contains the boiler, absorber, and condenser) has no mechanism for enabling or allowing the introduction of forced air to the system so as to enhance the operational capabilities of the ASR system.

Other significant issues are at play in the tension between efficient operation of AC/HP and refrigerator systems, particularly, for example only, in use with vehicles such as RVs. The rising cost of fuel, for example, has led RV manufacturers to adopt strategies to increase the efficiency and decrease the operating cost of RVs. A major initiative by these manufacturers is to use lighter materials to reduce the weight of the vehicle so that weight is less of the penalty. That is to say, a lighter RV uses less fuel and so forth. Unfortunately, this lighter weight creates a new penalty. If, as is customary in the prior art, the AC/HP unit remains in its usual roof mounted location while at the same time the RV itself is lightened, then the RV center of gravity is incrementally raised. As a result, the stability of the RV is decreased and the tendency of the RV to roll is increased.

Still further, it should be known that roof mounted AC/HP units have a major flaw when operating in the heating mode. That is, in this situation, if the unit is exposed to an unseasonable ice or snowstorm, then the grills and coils of the unit become obstructed, frequently, with snow and/or ice and the unit is rendered useless.

Thus, there is a need in the art for more efficient AC/HP units and refrigerators, for use with vehicles in particular, which simply, easily, and inexpensively address the above stated problems. It, therefore, is an object of this invention to provide an improved combination AC/HP-refrigerator apparatus and method which eliminates aerodynamic drag, results in a more efficient AC/HP system and, at the same time, a more efficient refrigerator system, lowers the center of gravity, increases stability, decreases the tendency of vehicles to roll and eliminates the possibility of bad weather malfunction.

SUMMARY OF THE INVENTION

Accordingly, the combination AC/HP-refrigerator apparatus of the present invention includes, according to one embodiment, a common condenser duct connected to an AC/HP device with a condenser and to a refrigerator, wherein the AC/HP condenser is located in the condenser duct above the refrigerator. A boiler duct is connected to the refrigerator and an evaporator duct is connected to the AC/HP device.

According to a further aspect of the invention, a fan is provided in the condenser duct. According to another aspect of the invention, an air intake and an air exhaust are connected to the condenser duct. According to a further embodiment of this aspect, the combination AC/HP-refrigerator is located within a vehicle and the air intake and air exhaust of the condenser duct are located on an external surface of the vehicle. According to another aspect of the invention, the air intake is a low-profile funnel shaped duct and the air exhaust is a low-profile fantail shaped duct.

According to a further aspect of the invention, a common drip pan is provided for both the AC/HP device and the refrigerator. According to one aspect of the invention, the refrigerator is an absorption system refrigerator. According to another aspect of the invention, the AC/HP device further includes a fan connected to the condenser duct such that air is directed past refrigerator components before passing the AC/HP condenser. An AC/HP motor and an AC/HP compressor are located below the refrigerator components and a fan is connected to the evaporator duct such that air is directed past an AC/HP evaporator located within the evaporator duct. According to another aspect of the invention, the refrigerator further includes a condenser and an absorber wherein both the refrigerator condenser and the absorber are located in the condenser duct below the AC/HP device condenser.

In accordance with another embodiment of the invention, in a RV including an AC/HP device and a refrigerator, a combination AC/HP-refrigerator apparatus includes a common condenser duct connected to an AC/HP device with a condenser, a motor, a compressor, and an evaporator. The common condenser duct is also connected to a refrigerator and the AC/HP condenser is located in the condenser duct above the refrigerator components in the condenser duct. A boiler duct is connected to the refrigerator and an evaporator duct is connected to the AC/HP device wherein the AC/HP device evaporator is located in the evaporator duct. A fan is connected to the condenser duct such that air is directed past the refrigerator components before passing the AC/HP condenser and a fan is connected to the evaporator duct such that air is directed past the AC/HP evaporator.

According to a further aspect of this invention, the refrigerator further includes a condenser and an absorber wherein both the refrigerator condenser and refrigerator absorber are located in the condenser duct below the AC/HP device condenser. According to another aspect of this invention, the AC/HP motor and AC/HP compressor are located below the refrigerator. According to a further aspect of the invention, an air intake and an air exhaust is connected to the condenser duct. According to another aspect of this invention, the combination AC/HP-refrigerator is located within the RV and the air intake and air exhaust are located on an external surface of the RV. According to a further aspect of this invention the air intake is a low-profile funnel shaped duct and the air exhaust is a low-profile fantail shaped duct. According to another aspect, a common drip pan is provided for the AC/HP device and the refrigerator.

According to another embodiment of the invention, in a RV including an AC/HP device and a refrigerator, a method of increasing the efficiency and capacity of the AC/HP device and the refrigerator includes connecting a common condenser duct to an AC/HP device with a condenser, a motor, a compressor, and an evaporator. Further, the common condenser duct is connected to a refrigerator and the AC/HP condenser is located in the condenser duct above refrigerator components in the condenser duct. A boiler duct is connected to the refrigerator. An evaporator duct is connected to the AC/HP device and the AC/HP device evaporator is located within the evaporator duct. A fan is connected to the condenser duct and air is directed past the refrigerator components before the air passes the AC/HP condenser. A fan is connected to the evaporator duct and air is directed past the AC/HP evaporator.

According to another aspect of the invention, the AC/HP device and the refrigerator are located within the RV. Further, an air intake and air exhaust are connected to the condenser duct and are located on the external surface of the RV. According to another aspect of the invention, the air intake is a low-profile funnel shaped duct and the air exhaust is a low-profile fantail shaped duct. According to another aspect of the invention, a common drip pan is provided for the AC/HP device and the refrigerator.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
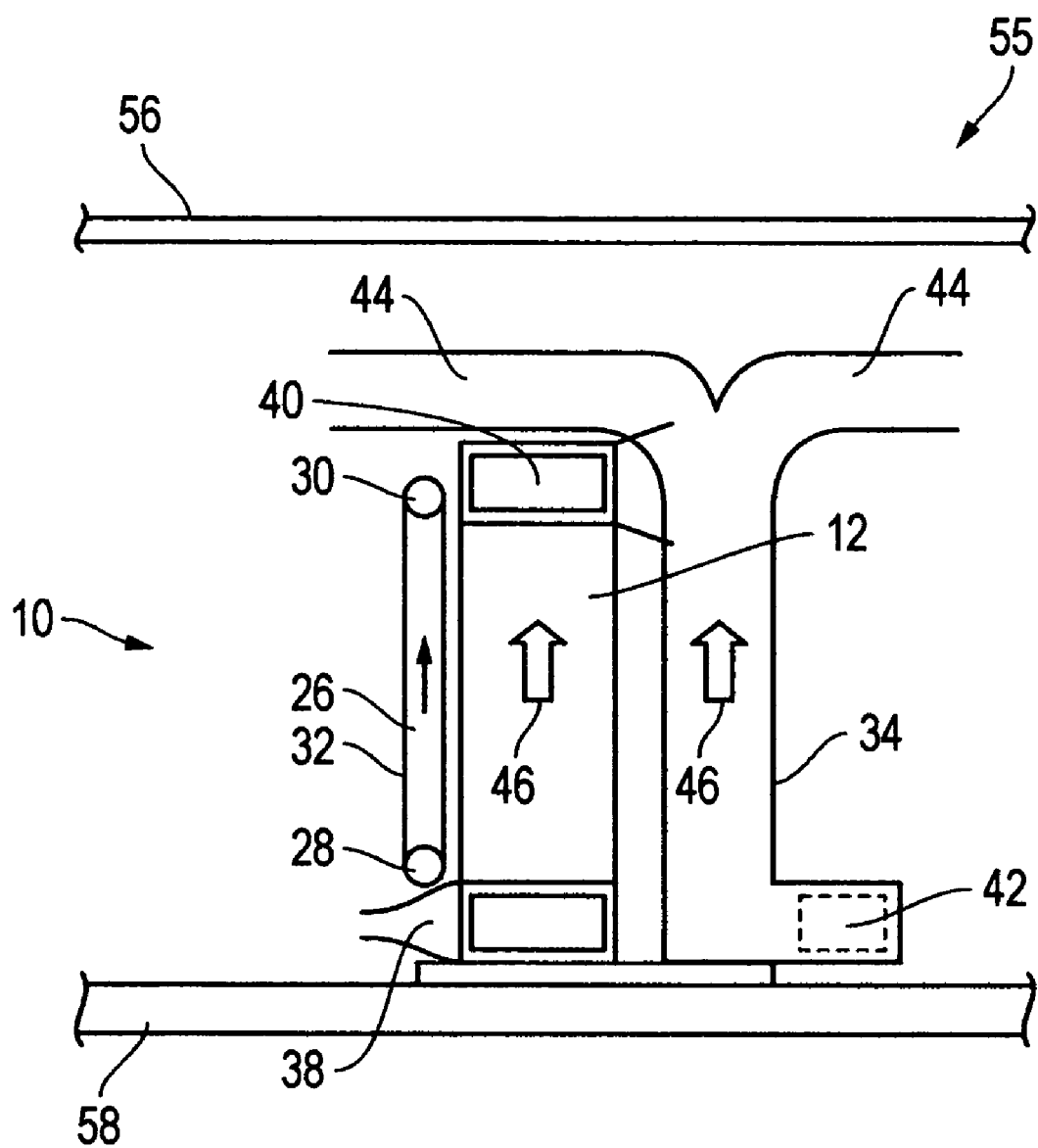
FIG. 1 is a side view of the combination AC/HP-refrigerator apparatus according to an embodiment of the present invention showing the ducting.
Figure 2:
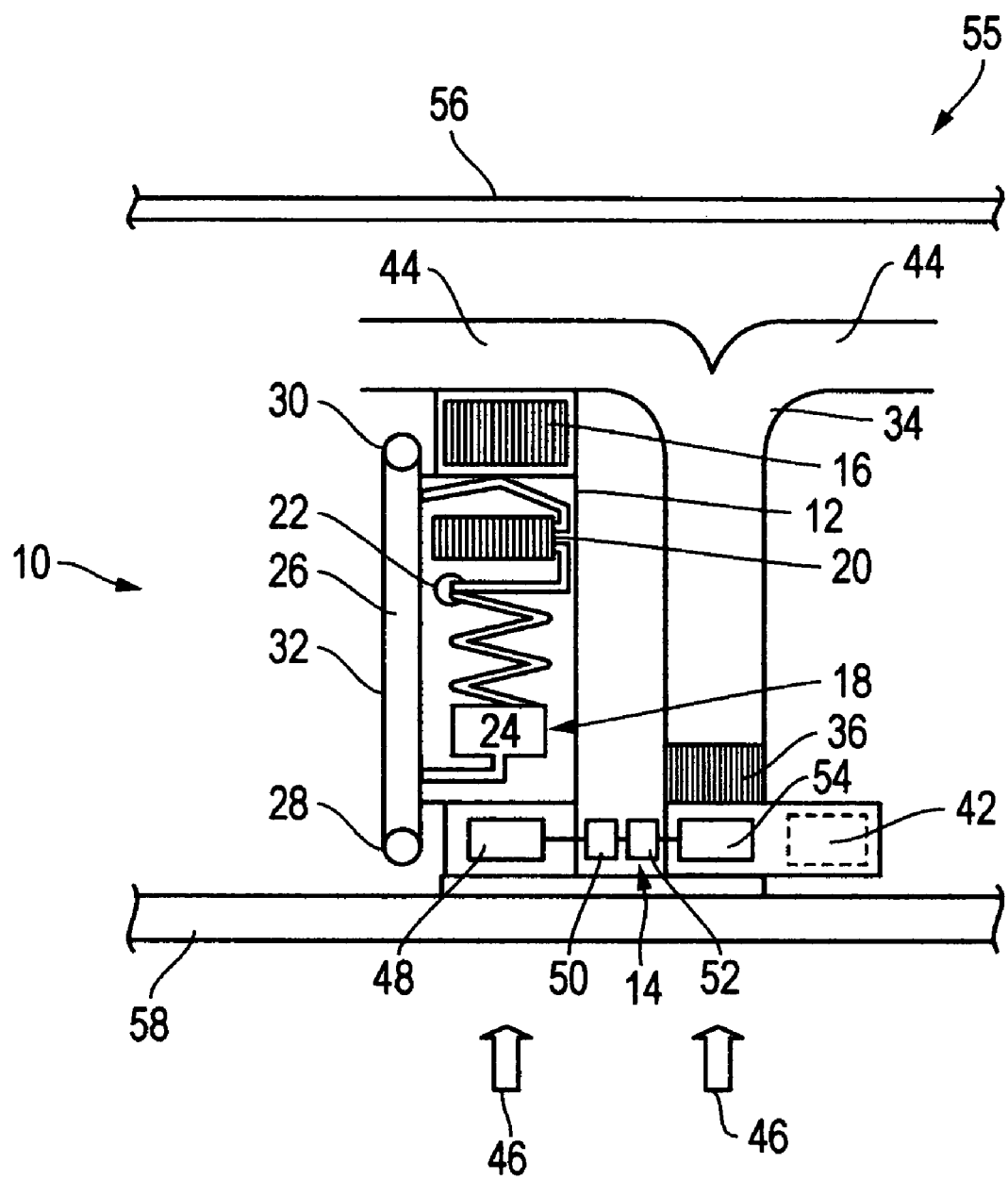
FIG. 2 is a side view of the embodiment of FIG. 1 illustrating AC/HP and refrigerator components in place within the ducting.

An embodiment of the present invention is illustrated by way of example in FIGS. 1–6. With specific reference to FIGS. 1 and 2, the combination AC/HP-refrigerator apparatus 10 of the present invention according to one embodiment includes a common condenser duct 12. Common condenser duct 12 is connected, as illustrated and as will be more fully disclosed hereafter, to AC/HP device 14 with a condenser 16. Common condenser duct 12 is also connected to refrigerator 18. As illustrated in FIG. 2, condenser 16 of AC/HP device 14 is located within common condenser duct 12 above refrigerator 18 components. That is to say, common condenser duct 12 when viewed as a vertical shaft, includes at the top of the column AC/HP device 14 condenser 16. When looked at in this manner, AC/HP device condenser 16 is located above refrigerator 18 components. As illustrated in FIG. 2, common condenser duct 12 includes the following refrigerator components: condenser 20, evaporator connections 22 and absorber 24. As used herein, the term "connected" includes the common meaning of the term. That is to say, common condenser duct 12 is connected to AC/HP device 14 as illustrated providing a housing for AC/HP device condenser 16 as well as refrigerator 18 components condenser 20, evaporator connections 22 connected to refrigerator evaporator 23 (as more clearly illustrated in FIGS. 3 and 4 inside refrigerator 18), and absorber 24 all as illustrated. Also, as used herein, the terms "above" and "below" include their normal obvious meanings in accordance with the illustrations provided herein.

Still referring to FIGS. 1 and 2, a boiler 26 is connected to refrigerator 18 and includes a boiler intake 28 and boiler exhaust 30. The operation of boilers with refrigerators, for example only and not by limitation, absorption system refrigerators (ASR), is well-known and well within the skill levels of those of ordinary skill in the art. As such, the operation of the refrigerator boiler 26 is not disclosed or described further herein. According to one embodiment, boiler 26 is located within separate boiler duct 32. Additionally, evaporator duct 34 is connected to AC/HP device 14. In this regard, as illustrated in FIG. 2, evaporator duct 34 encloses AC/HP device 14 evaporator 36. Put another way, evaporator 36 of AC/HP device 14 is located within evaporator duct 34.

Referring now particularly to FIG. 1, according to an embodiment of the invention, common condenser duct 12 includes condenser duct intake 38 and condenser duct exhaust 40. According to one embodiment of the invention, condenser duct intake 38 and condenser duct exhaust 40 are located on the outside of a vehicle and have a particular low-profile form as more fully illustrated in FIGS. 5a and 5b as will be discussed more fully hereafter. Additionally, evaporator duct 34 includes evaporator duct intake 42 and evaporator duct exhaust 44. In general, airflow within common condenser duct 12 and evaporator duct 34 is in the direction of direction arrows 46 in that air enters common condenser duct 12 by intake 38 and exits at exhaust 40. Again, according to a preferred embodiment, intake 38 and exhaust 40 are located externally on the skin or exterior side of a vehicle. With regard to evaporator duct 34, air flows in the direction of direction arrow 46 with the air entering internal intake 42 and exiting at internal exhaust 44.

Referring now particularly to FIG. 2, AC/HP device 14 components are further illustrated. According to one embodiment of the invention, AC/HP device 14 includes fan 48, motor 50, compressor 52 and fan 54. As illustrated, all of these AC/HP device 14 elements, i.e. fan 48, motor 50, compressor 52 and fan 54 are located below refrigerator 18. Only AC/HP device 14 condenser 16 is located above refrigerator 18 components. By way of this organizational structure, condenser 16 therefor does not heat any of the refrigerator 18 components. Again, FIG. 2 shows the general direction of air through the system by means of directional arrows 46. As result, it is clear that air introduced into the common condenser duct 12 passes over refrigerator 18 components prior to passing over condenser 16 of AC/HP device 14.

Still referring to FIGS. 1 and 2, the figures show the combination AC/HP-refrigerator apparatus 10 located within a structure 55 with a roof 56 and a floor/frame 58. Obviously, Applicant's invention in may be practiced within-any structure 55 now known or hereafter developed. Again, for purposes of example only and not by way of limitation, roof 56 and floor 58 may be those of any vehicle such as an RV, bus, truck, plane, boat or the like.

Figure 3:
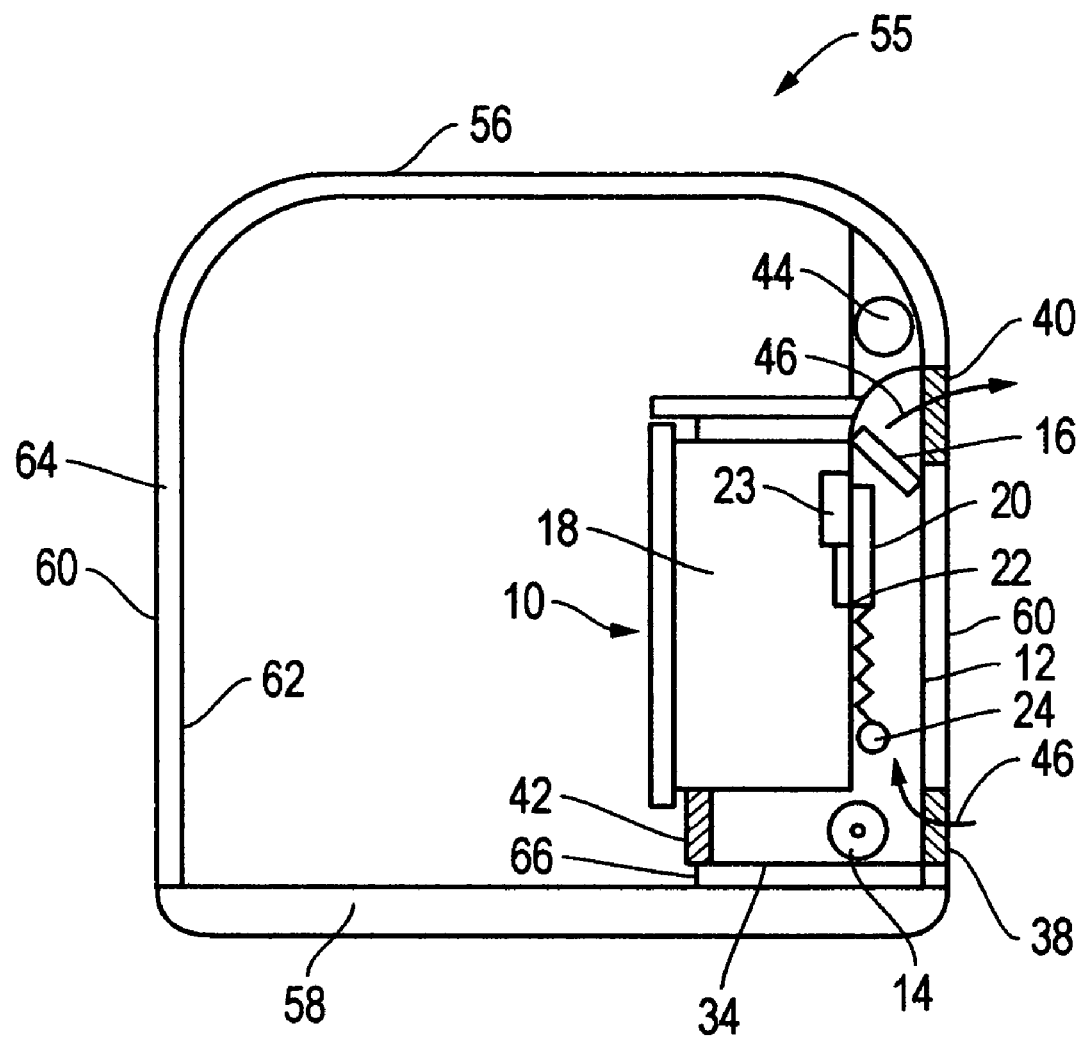
FIG. 3 is an end view of the embodiment of FIG. 1 located within a vehicle.
Figure 4:
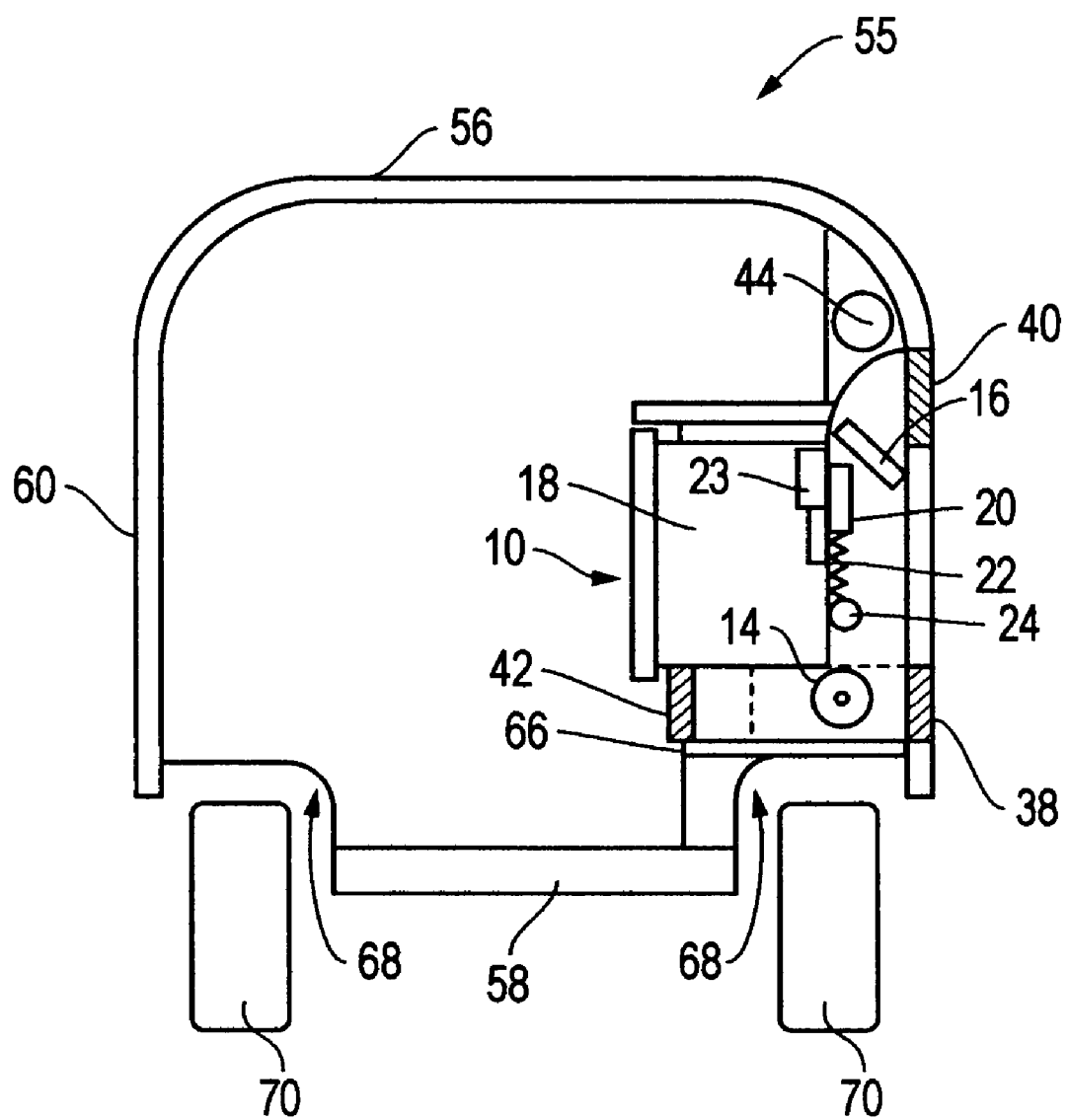
FIG. 4 is an end view of the embodiment of FIG. 1 located within a vehicle over a wheel well.

Referring now to FIGS. 3 and 4, the location of the combination AC/HP-refrigerator apparatus 10 of the present invention within a structure 55, such as an RV for example only, is illustrated. The vehicle includes a roof 56 and a floor 58 as well as sides 60. These form an inside surface 62 and an external surface 64. FIG. 3 provides another perspective of the invention discussed with reference to Figures 1 and 2. In this perspective, refrigerator 18 is shown located within structure 55 with most of the elements of AC/HP device 14 located below refrigerator 18. Common condenser duct 12 is illustrated so that it is clear that refrigerator 18 components including absorber 24, evaporator connections 22 and condenser 20 are located underneath, below, AC/HP condenser 16. Once again, by way of explanation, air enters common condenser conduct intake 38 passes over refrigerator absorber 24, evaporator connections 22 and condenser 20 before passing AC/HP condenser 16 and exiting from condenser duct exhaust 40 in the direction of the direction arrows 46. Refrigerator 18 also is illustrated with evaporator 23 on the inside of refrigerator 18.

Also illustrated is evaporator duct 34 with evaporator duct intake 42 and evaporator duct exhaust 44. It is clear from the illustration that air from the inside of structure 55 is introduced into evaporator duct 34 at the evaporator duct intake 42. Thereafter, air passes over a AC/HP evaporator 36 (not shown in these figures) before exiting from the evaporator duct exhaust 44. Both FIGS. 3 and 4 illustrate an advantage of the combination AC/HP-refrigerator apparatus 10 in the form of common drip pan 66. By way of "common", it is meant that a single drip pan 66 is utilized for both AC/HP device 14 and refrigerator 18 in accordance with the unique structure of the present invention.

Referring now to FIG. 4, the structure 55 is illustrated in place in a vehicle with wheel wells 68 for the accommodation of wheels 70. As is illustrated, the structure and organization of the Applicants invention is unchanged with the exception that refrigerator 18 may need to be a smaller, more compact version in this particular location.

Figure 5A:
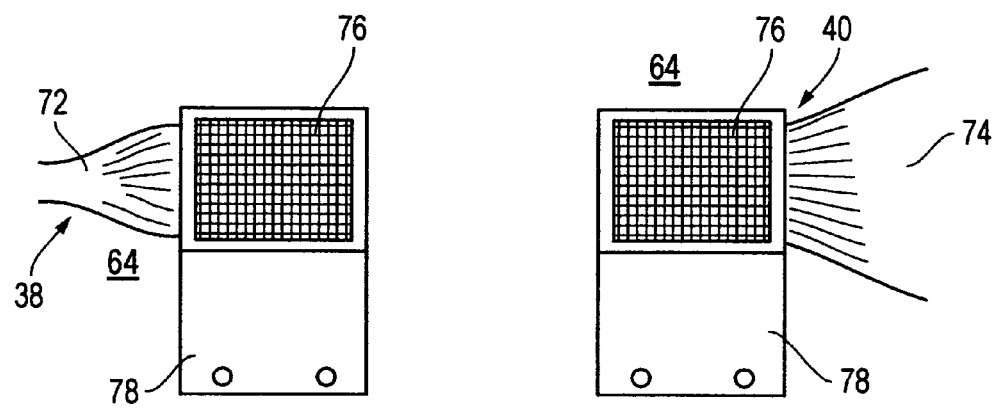
FIG. 5a is a view of intake and exhaust devices in an opened or parked position and FIG. 5b is a view of the same intake and exhaust devices in a closed or traveling position.
Figure 5B:
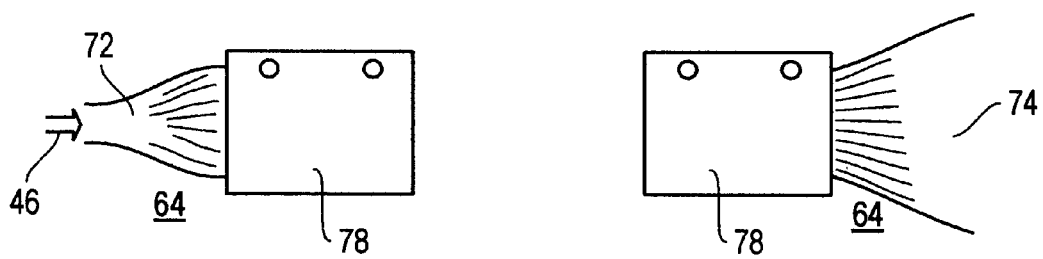

Referring now to FIGS. 5a and 5b, one aspect of the invention is illustrated in detail. According to one embodiment of the invention, condenser duct intake 38 and condenser duct exhaust 40 are located on the exterior surface 64 of structure 55. FIG. 5a shows condenser duct intake 38 as a low-profile funnel shaped duct 72. Likewise, FIG. 5a. shows condenser duct exhaust 40 in the shape of a low-profile fantail shaped duct 74. In operation, both these low-profile ducts are shaped into the external surface 64 of the structure 55. The low profile ducts function, by enabling air to enter and exhaust simply and easily to the common condenser duct 12 without unnecessarily obstructing the external surface 64 of structure 55. FIG. 5a shows the low-profile duct connected to a duct grill 76 with a duct grill cover 78 in the open position when structure 55 is parked.

FIG. 5b shows duct grill covers 78 in the closed or traveling position. In this position, air enters in the direction of direction arrow 46 the low-profile funnel shape duct 72 and is forced into common condenser duct 12 (not shown in this figure). Thereafter, the air passes through the system as described in detail above and exits the system at low-profile fantail shaped duct 74. When traveling, the result is the utilization of the relative motion of the vehicle to force air through the system, as described above, so as to greatly enhance the efficiency of the ASR system.

Figure 6:
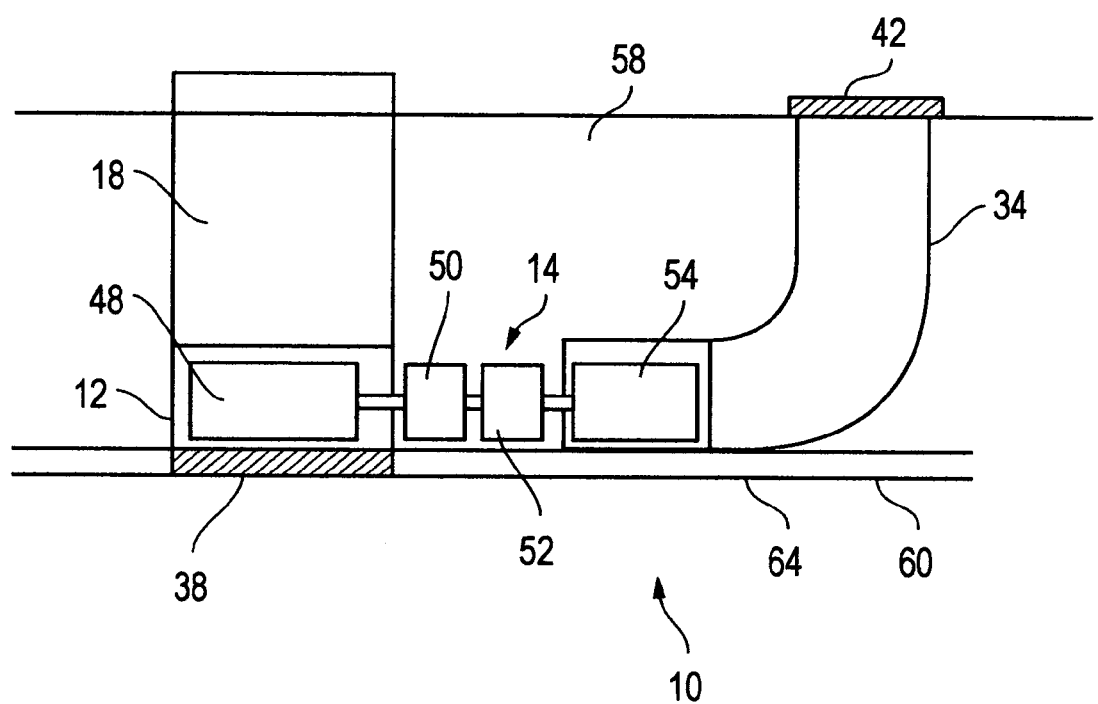
FIG. 6 is a top view of the embodiment of FIG. 1.

Referring now to FIG. 6, a top view of the combination AC/HP-refrigerator apparatus 10 of the present invention is provided. In this view, it can be further appreciated that refrigerator 18 shares common condenser duct 12 with AC/HP device 14. This figure also illustrates the location of fan 48 within common condenser duct 12. Fan 48 is part of AC/HP device 14 components along with AC/HP device 14 compressor 52, motor 50 and fan 54. Each of these components are located down low in structure 55 close to, or on or below, floor 58. Evaporator 36 of AC/HP device 14 (not shown in this figure) is situated such that air is introduced into the evaporator duct 34 at interior evaporator duct intake 42 and then passes from fan 54 over evaporator 36 prior to exiting evaporator at evaporator duct exhaust 44 (not shown in this figure).

By way of further explanation, the combination AC/HP-refrigerator apparatus 10 of the present invention enables the removal of the AC/HP device 14 from the roof 56 of vehicles 55. Advantageously, as illustrated herein, AC/HP device 14 is relocated at the floor level 58 below the ASR refrigerator 18. This relocation solves many of the prior art problems concerning aerodynamic drag, the center of gravity/stability, and AC/HP serviceability and lowers the height of the vehicle 55 thereby improving clearance. Obviously, it can be appreciated that these elements may actually be located below the floor 58 of a vehicle such as large buses, trains, planes, boats, and so forth.

A key element of the invention is the common condenser duct 12 located behind refrigerator 18. As known in the prior art, ASR refrigerator 18 includes one duct. According to the present invention, a single large, common condenser duct 12 is used for both the AC/HP device 14 and the ASR refrigerator 18. It contains both the absorber 24 and condenser 20 of the ASR refrigerator 18 as well as the condenser 16 of AC/HP device 14. Common condenser duct 12, as can be appreciated by the above detailed description, is ventilated by convection, induction, or forced airflow. Importantly, the air flows over refrigerator 18 components prior to passing AC/HP condenser 16. As can be appreciated, the common condenser duct 12 maximizes space utilization within structure 55 by the consolidation and use of a particular volume of space for multiple functions.

By way of the present invention, the boiler 26 of the ASR refrigerator 18 is enclosed within a smaller, separate, boiler duct 32 so as to protect the propane flame (not shown) from gusts and forced airflow and is ventilated by convection alone by means of the boiler intake 28 and boiler exhaust 30. It should by now be appreciated that the operation of the AC/HP device 14 and the ASR refrigerator 18 remain independent. The AC/HP device 14 can operate without the ASR 18 running. Conversely, the ASR 18 can operate without the AC/HP device 14 running. Nonetheless, the two systems become interdependent according to the Applicant's present invention because they share a common condenser duct 12. Thus, a symbiosis is created. As described herein, the AC/HP condenser 16 is removed from its usual location on the AC/HP device 14. According to the present invention, the condenser 16 is relocated in the common condenser duct 12 above the refrigerator condenser 20, and other components, so that the heat dissipated by the AC/HP condenser 16 does not decrease the efficiency of the refrigerator 18. The AC/HP condenser 16 is reconnected to the AC/HP device 14 by any means now known or hereafter developed including hoses, metal tubes, and/or the like.

Advantageously, the forced air draft produced by the AC/HP fan 48 located in common condenser duct 12 when the AC/HP device 14 is running significantly increases the efficiency of the ASR refrigerator 18 by a factor, according to Applicant's computations, of two hundred percent or more. Additionally the corresponding recovery time of the ASR refrigerator 18 is reduced and approaches that of a typical mechanized-type of refrigerator. This unique feature of Applicant's invention eliminates the need for add on auxiliary fans to the ASR devices known in the art designed to attempt to force air over the refrigerator condenser 20 in an attempt to improve refrigerator efficiency. These supplementary fans have the added disadvantage of draining the RV storage batteries and adding weight, complexity and cost to the existing system. Thus, Applicant's structural arrangement constitutes an energy efficiency and energy reutilization which heretofore has been wasted.

A third duct or shaft is provided in Applicant's invention for the AC/HP evaporator 36. This evaporator duct 34 draws warm air into a floor mounted grill by means of evaporator duct intake 42 to be cooled. Evaporator duct 34 distributes the cooled air via the evaporator duct 34 as the cooler air exits evaporator duct exhaust 44 wherever conveniently located and directed within structure 55.

Heretofore, the size of AC/HP device 14 evaporator 36 coils and the like have been limited by the size of the typical roof top unit. As discussed above, the current state-of-the-art is pressuring these rooftop units to become even smaller and more aerodynamically configured. By means of Applicant's combination AC/HP-refrigerator apparatus 10, the relocation of the AC/HP device 14 to the floor level 58 (or below) of structure 55 allows for the enlargement of the fans 54 and 48 and both the AC/HP evaporator 36 and condenser 16 coils. By also increasing the surface area due to additional space available within structure 55, the efficiency of Applicant's AC/HP device 14 is increased, according to Applicant's calculations, by a factor of two hundred percent or more. This increase in efficiency of the AC/HP device 14 may in fact be so significant that the need for multiple AC/HP units 14 as found on larger RVs is totally eliminated. As a further result, weight, usually placed high above the center of gravity may be removed and eliminated altogether.

As discussed, a common drip pan 66 of adequate dimensions is placed under both the AC/HP device 14 and the ASR refrigerator 18 to collect any condenser water vapor for drainage to the exterior of the RV.

One aspect of the invention is to recess the condenser duct intake 38 and condenser duct exhaust 40 so as to create low-profile funnel shaped duct 72 and low-profile fantail shaped duct 74. The location of these intakes and exhausts is as illustrated with a funnel shaped duct 72 on the leading edge and the fantail shaped duct 74 on the trailing edge. This structural organization results in the induction of airflow vertically in the common condenser duct 12 when the RV is in a forward motion and the AC/HP device 14 is not running. This results in the greatly increased efficiency of the ASR refrigerator 18 while traveling as discussed above.

Finally, it should be understood, that the function of the condenser 16 and evaporator 36 of AC device 14 remains the same at all times. However, the function of the two coils in an HP unit is the same as that of an AC unit when the HP is operating in the cooling mode, but is reversed when the HP is operating in the heating mode. Further, the naming of the ducts in the text corresponds to the operations of either an AC unit or a HP unit in the cooling mode. Further, the operation of the HP unit in the heating mode was not discussed for reasons of clarity, simplicity, and the avoidance of confusion. However, the operation of a HP unit in the heating mode does not affect in any way the performance of the AC/HP device 14 and/or the ASR refrigerator 18 or the symbiotic relationship as described above. It should be understood that the symbiotic design was formulated, in part, to correct difficulties in the performance of ASR refrigerators 18. However, refrigerators 18 of other designs with a condenser in the rear may be installed and benefit from the design of Applicant's invention as set forth herein to the same degree as ASR refrigerators 18.

While the combination AC/HP-refrigerator apparatus and method 10 of the present invention has been disclosed in connection with use within a structure, for example an RV, it should be appreciated that the apparatus and method provide heating and air-conditioning and refrigeration advantages no matter what the structure. Thus, while the present invention has been disclosed in connection with the preferred embodiment thereof, it should be understood that there may be other embodiments which fall within the spirit and scope of the invention as defined by the following claims.

What is claimed is:

1. A combination AC/HP-refrigerator apparatus comprising:
   a. a common condenser duct connected to an AC/HP device with a condenser and to a refrigerator wherein the AC/HP condenser is located in the common condenser duct above the refrigerator;
   b. a boiler duct connected to the refrigerator; and
   c. an evaporator duct connected to the AC/HP device.

2. The apparatus of claim 1 further including a fan in the common condenser duct.

3. The apparatus of claim 1 further including an air intake and an air exhaust connected to the common condenser duct.

4. The apparatus of claim 3 wherein said combination AC/HP-refrigerator is located within a vehicle and said air intake and said air exhaust are located on an external surface of said vehicle.

5. The apparatus of claim 4 wherein the air intake is a low profile funnel shaped duct and the air exhaust is a low profile fantail shaped duct.

6. The apparatus of claim 1 further comprising a common drip pan for both the AC/HP device and the refrigerator.

7. The apparatus of claim 1 wherein said refrigerator is an absorption system refrigerator.

8. The apparatus of claim 1 wherein the AC/HP device further comprises:
   a. a fan connected to the common condenser duct such that air is directed past refrigerator components before passing the AC/HP condenser;
   b. an AC/HP motor and an AC/HP compressor located below the refrigerator components; and
   c. a fan connected to the evaporator duct such that air is directed past an AC/HP evaporator located within said evaporator duct.

9. The apparatus of claim 1 wherein the refrigerator further comprises:
   a. a condenser; and
   b. an absorber and wherein both said condenser and absorber are located in said common condenser duct below said AC/HP device condenser.

10. In a RV including an AC/HP device and a refrigerator, a combination AC/HP-refrigerator apparatus comprising:
    a. a common condenser duct connected to an AC/HP device with a condenser, a motor, a compressor, and an evaporator and to a refrigerator wherein the AC/HP condenser is located in the condenser duct above refrigerator components in the common condenser duct;
    b. a boiler duct connected to the refrigerator;
    c. an evaporator duct connected to the AC/HP device wherein said AC/HP device evaporator is located in said evaporator duct;
    d. a fan connected to the common condenser duct such that air is directed past said refrigerator components before passing the AC/HP condenser; and
    e. a fan connected to the evaporator duct such that air is directed past said AC/HP evaporator.

11. The apparatus of claim 10 wherein the refrigerator further comprises:
    a. a condenser; and
    b. an absorber and wherein both said refrigerator condenser and absorber are located in said common condenser duct below said AC/HP device condenser.

12. The apparatus of claim 10 wherein said AC/HP motor and AC/HP compressor are located below said refrigerator.

13. The apparatus of claim 10 further including an air intake and an air exhaust connected to the common condenser duct.

14. The apparatus of claim 13 wherein said combination AC/HP-refrigerator is located within said RV and said air intake and air exhaust are located on an external surface of said RV.

15. The apparatus of claim 14 wherein the air intake is a low profile funnel shaped duct and the air exhaust is a low profile fantail shaped duct and include moveable covers.

16. The apparatus of claim 10 further comprising a common drip pan for the AC/HP device and the refrigerator.

17. In a RV including an AC/HP device and a refrigerator, a method of increasing the efficiency and capacity of said AC/HP device and said refrigerator, the method including the steps of:
    a. connecting a common condenser duct to an AC/HP device with a condenser, a motor, a compressor, and an evaporator and to a refrigerator and locating the AC/HP condenser in the common condenser duct above refrigerator components in the common condenser duct;
    b. connecting a boiler duct to the refrigerator,
    c. connecting an evaporator duct to the AC/HP device and locating said AC/HP device evaporator in said evaporator duct;
    d. connecting a fan to the common condenser duct and directing air past said refrigerator components before said air passes the AC/HP condenser; and
    e. connecting a fan to the evaporator duct and directing air past said AC/HP evaporator.

18. The method of claim 17 further comprising the steps of:
    a. locating the AC/HP device and the refrigerator within said RV; and
    b. connecting an air intake and an air exhaust to said common condenser duct and locating said air intake and said air exhaust on an external surface of said RV.

19. The method of claim 18 wherein the air intake is a low profile funnel shaped duct and the air exhaust is a low profile fantail shaped duct.

20. The method of claim 17 further comprising the step of providing a common drip pan for the AC/HP device and the refrigerator.

* * * * *